United States Patent
Furuhata et al.

[11] Patent Number: 5,943,043
[45] Date of Patent: Aug. 24, 1999

[54] TOUCH PANEL "DOUBLE-TOUCH" INPUT METHOD AND DETECTION APPARATUS

[75] Inventors: Tomotake Furuhata, Yokohama; Toshiki Hirano; Chihiro Sawada, both of Tokyo, all of Japan

[73] Assignee: International Business Machines Corporation, Armonk, N.Y.

[21] Appl. No.: 08/761,101

[22] Filed: Dec. 5, 1996

[30] Foreign Application Priority Data

Nov. 9, 1995 [JP] Japan ................................. 7-290801

[51] Int. Cl.⁶ .................................................. G09G 5/00
[52] U.S. Cl. ............................................................. 345/173
[58] Field of Search ................................. 345/173, 174; 178/18

[56] References Cited

U.S. PATENT DOCUMENTS

| | | | |
|---|---|---|---|
| 4,914,624 | 4/1990 | Dunthorn | 345/173 |
| 5,402,151 | 3/1995 | Duwaer | 345/173 |
| 5,570,113 | 10/1996 | Zetts | 345/173 |
| 5,579,036 | 11/1996 | Yates, IV | 345/173 |
| 5,691,748 | 11/1997 | Fukuzaki | 345/173 |

FOREIGN PATENT DOCUMENTS 0490001  12/1990  European Pat. Off. .

*Primary Examiner*—Jeffery A. Hofsass
*Assistant Examiner*—John Tweel, Jr.
*Attorney, Agent, or Firm*—Martin J. McKinley

[57] ABSTRACT

A "double-touch" input method is described that is particularly suitable for use as a substitute for a "double-click" input from a mouse or trackball, and that is particularly suitable for use with a touch panel. Briefly, the input method involves contacting a touch panel at a first location (for example, over an area where an icon is displayed) with a first finger. Before a predetermined period of time $T_{wait}$ elapses, a second finger "taps" the panel at a second location. The location tapped by the second finger is greater than a predetermined distance from the first location tapped by the first finger. In addition, the tap by the second finger is shorter than a second predetermined period of time $T_{tap}$. After the tap by the second finger, the first finger is still in contact with the touch panel. The position of the first finger after the tap should be within a predetermined range of its position just prior to the tap. Apparatus in the form of a device driver is described for detecting a double touch input.

4 Claims, 4 Drawing Sheets

TOUCH PANEL "DOUBLE-TOUCH" INPUT METHOD AND DETECTION APPARATUS

BACKGROUND OF THE INVENTION

Japanese Application No. 7-290801 filed Nov. 9, 1995 and its translation are incorporated into this application by reference.

This invention pertains to systems for inputting information into a computer or other information handling system and, more particularly, to an input system particularly suitable for use with a touch sensitive display and particularly useful as a substitute for a "double click" input from a mouse or other pointing type input device.

As personal computers are employed in places other than offices, there is an increased demand for new input devices that can take the place of the user interface that involves the use of a keyboard and a mouse. As a result of the request for new input devices, attention has been directed to touch panels, which are devices that are attached to the screens of display devices and that accept data input accomplished by users touching the screens with their fingers. Currently, touch panels are already being used widely as terminal interfaces for financial and factory automation terminals.

Touch panels are roughly classified into two types; one type is shown in FIG. 5 wherein position information is detected using the change in sheet resistance that results from the touch of a finger, and an optical type (not shown) wherein position information is acquired by scanning the X-Y plane and detecting the shielding effect of a finger touching the display.

When an operator presses an arbitrary area on the surface of a touch panel with his or her finger, the touch panel outputs the location of the position pressed with the finger as X-Y two-dimensional position information. An example structure of a sheet resistance touch panel will now be briefly described with reference to FIG. 5. For the touch panel, a sheet for detecting the X directional position and a sheet for detecting the Y directional position are overlapped. FIG. 5 illustrates a sheet for one of the directions. The sheet is provided by attaching two rectangular transparent or translucent electrodes 2 and 4 opposite each other with an intervening layer that consists of a fluid insulation material (not shown). A predetermined direct current voltage V is applied between one side 6 of the transparent electrode 2 and an opposite side 8, and the other transparent electrode 4 is, for example, grounded at a side 10. When a finger touches the transparent electrode 2, it contacts the transparent electrode 4 causing a short-circuit, thereby changing the sheet resistance at the transparent electrode 2. This change in resistance is used to detect the location of the position touched by the finger. Sheets are used for both X and Y directions to provide a two-dimensional location of the point on the display that has been touched by the finger.

An example operation during which a finger is used to touch such a touch panel will now be explained while referring to FIG. 6. FIG. 6 is a diagram showing one display screen of a personal computer to which a touch panel is attached. Two windows 24 and 30 for applications 1 and 2 are opened. Three other applications are displayed by using icons at the lower left of the screen.

If the window 24 for application 1 is to be transversely extended across the display screen, as is indicated by the transverse arrow, an area 16 that represents the right side vertical frame of the window 24 is touched by a finger, and while the finger is moved to the right in contact with the tough-panel, the area 16 is extended. Similarly, if the window 24 is to be enlarged in the direction indicated by the lower right diagonal arrow, a window in the lower right corner 18 is pressed with a finger and moved diagonally to the lower right, so that the window 24 is enlarged.

When the function for an icon "m" 20 in the window 24 is to be activated, a finger is placed within the frame for the icon "m" and the frame is tapped once (single-tapping) with the finger, so that the function for the icon "m" is activated. In the same manner, if a scroll bar 22 is to be operated, a finger is placed within the frame and single-tapping is used to scroll the frame.

When the window 24 is to be closed, a frame 14 at the upper left corner of the window 24 is tapped twice (double-tapping) with a finger. Similarly, when an icon 12 at the lower left corner on the screen is to be opened, double-tapping with a finger is performed within the frame for the icon.

By using the touch panel, an operator can use his or her finger to directly instruct the moving of a pointer on a display screen and the "clicking" of a pointer, which are functions that are conventionally performed by using a mouse (or other pointing type input device, such as a trackball) and a button provided on the mouse.

However, as the display resolutions for personal computers are being increased and the graphics displayed by applications are becoming complicated, the size of the windows to be displayed, the size of the graphics in the windows, and the sizes of icons are reduced. Further, while pointing and clicking are easily performed with a mouse, comparable operations with a finger are difficult to determine.

For the double-tapping of a touch panel with a finger, which corresponds to the double clicking of a mouse, accurate performance is extremely difficult, except for the case where the resolution of a display and the resolution for position detection on a touch panel is low, and the case where a special process is performed to especially extend an area for which double-tapping is available.

A conventional data input method using double-tapping requires that the exact, same place on a touch panel be pressed twice within a short time. This manipulation can be performed so long as the touch area is large. However, to move applications in a plurality of windows on a display, a high resolution that provides an effect that is similar to that provided by double clicking using a mouse is required, and conventional double-tapping cannot provide the desired effect.

Although touch input systems using fingers do not require special devices, such as a pen, and are excellent as user interfaces for devices that are used by many people, such as online terminals in banks or factory automation controllers, the employment of touch panels is limited because of the above described problems. Actually, in the above application fields, only a single-tapping function is demonstrated and a double-tapping function is not provided.

However, current general purpose operating systems, such as the OS/2® operating system, and most application programs presume that single clicking and double clicking of the left button of a mouse will be employed. To use these software programs with a touch panel, the touch panel must somehow be made to acknowledge double-tapping.

Accordingly, it is one object of the present invention to provide a new input method suitable as a substitute for a "double click" input from a mouse, or as a substitute for a double tap input to a touch panel. It is also an object of this invention to provide an apparatus to detect this new input method.

SUMMARY OF THE INVENTION

Briefly, the invention is an input detection apparatus for use with a touch panel that outputs coordinate data indicative of the location on the panel touched by an object. The invention is also for use with a "double touch" input method wherein a first finger contacts the touch panel at a first location, and remains in contact with the touch panel while a second finger momentarily contacts the touch panel at a second location. The input detection apparatus includes a means for determining a first elapsed time ($T_1$) between the beginning of the contact by the first finger (see point 50) and the beginning of the contact by the second finger (see point 54), and for determining if the first elapsed time is less than a first predetermined period of time ($T_{wait}$). Means are also provided for determining a first distance between the point of contact by the first finger at a time prior to contact by the second finger (e.g., point 52), and the point of contact by the second finger (e.g., point 54), and for determining if this first distance is greater than a first predetermined distance. The input detection means also includes means for determining a second elapsed time ($T_2$) between the beginning of contact by the second finger (see point 54) and the disengagement of contact by the second finger (see point 56), and for determining if the second elapsed time is less than a second predetermined period of time ($T_{tap}$).

BRIEF DESCRIPTION OF THE DRAWINGS

FIG. 1, which includes individual

DESCRIPTION OF THE ILLUSTRATIVE EMBODIMENTS

A new input method that is particularly suitable for use with a touch panel and an apparatus for detecting such an input will now be described with reference to FIGS. 1, 2 and 4. This new input method will be referred to as the "double-touch" method to distinguish it from the conventional "double-tap" input method wherein the same area on the screen is "tapped" twice in rapid succession.

Figure 1A:
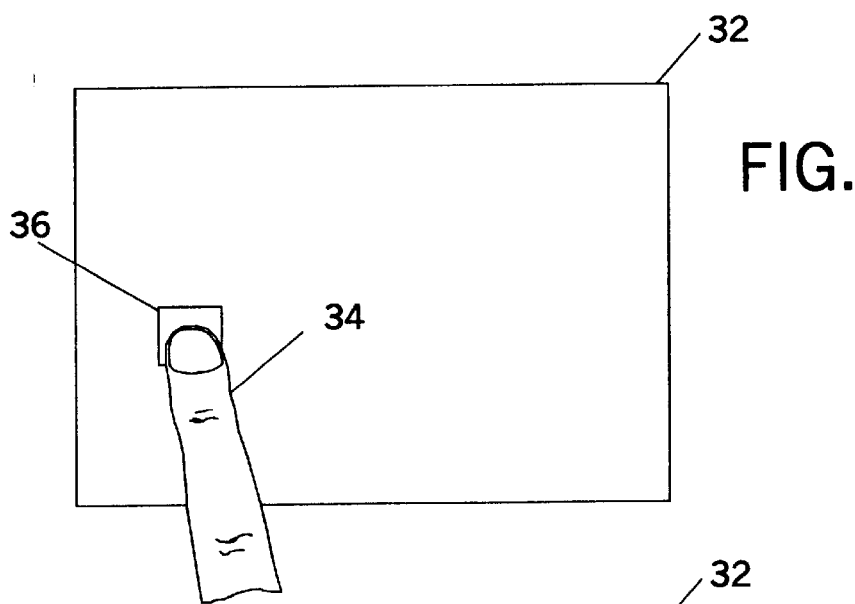
FIGS. 1(a), 1(b) and 1(c), illustrates the double touch input method of the present invention.
Figure 1B:
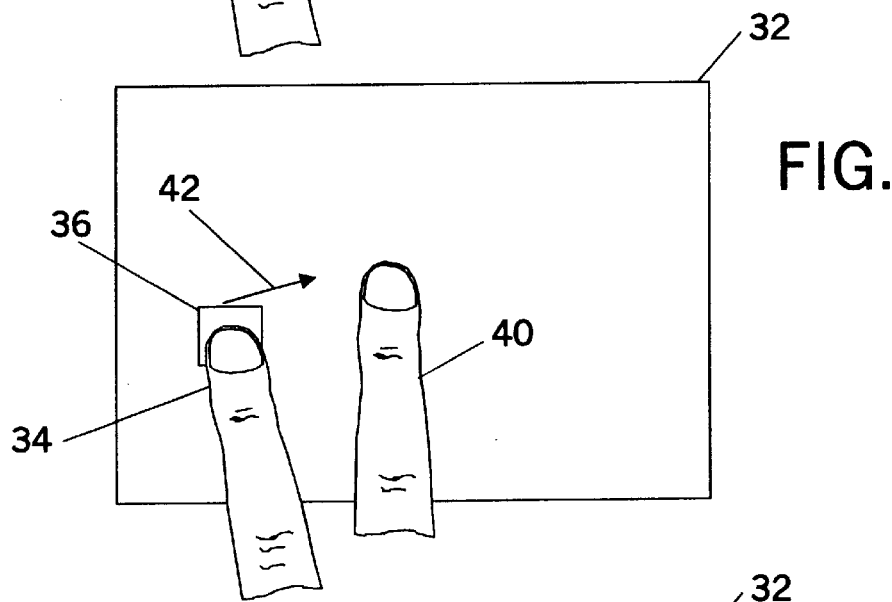

In FIG. 1(a), an icon 36 representing an application or other function to be opened by double-touching is present on a display screen to which a touch panel 32 is attached. An index finger 34 of an operator is pressed down within the boundaries or "frame" of the icon 36. The touch panel 32 then outputs coordinate data that corresponds to the location on the panel 32 that has been touched. While the index finger 34 remains in contact with the icon 36, a different location on the touch panel 32 is momentarily touched by a second finger, e.g., the middle finger 40, as illustrated in FIG. 1(b).

On a resistance type touch panel, when a touch input has occurred at two places at the same time, coordinate data is outputted corresponding to a position approximately midway between the two touched positions. Therefore, in FIG. 1(b), the coordinate data output corresponds to a point about midway between the index finger 34 and the middle finger 40, which is a point that is approximately located at the pointed end of the arrow 42.

Figure 1C:
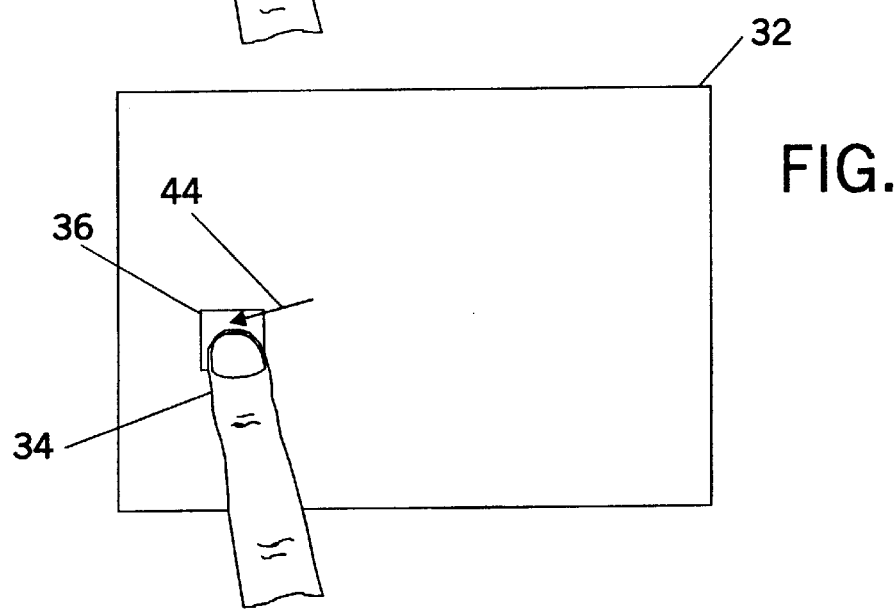

FIG. 1(c) illustrates the next step wherein the brief contact of the middle finger 40 with the touch panel has been completed, and only the index finger 34 continues to contact the panel over the icon 36. At this time, the coordinate data output corresponds to the point over the icon 36 where the index finger contacts the panel, which is a point that is approximately located at the pointed end of the arrow 44. Thereafter, the index finger 34 is released from the touch panel 32.

This embodiment of the invention will now be described by reference to FIG. 2, which is a graph in which time is plotted on the horizonal axis, and the position of contact between the finger and the touch panel as measured in the "X" direction is plotted on the vertical axis. The touch panel outputs both "X" and "Y" coordinate data. However, to simplify the explanation of the invention, only data corresponding to the "X" coordinate will be used in the following example.

Figure 2:
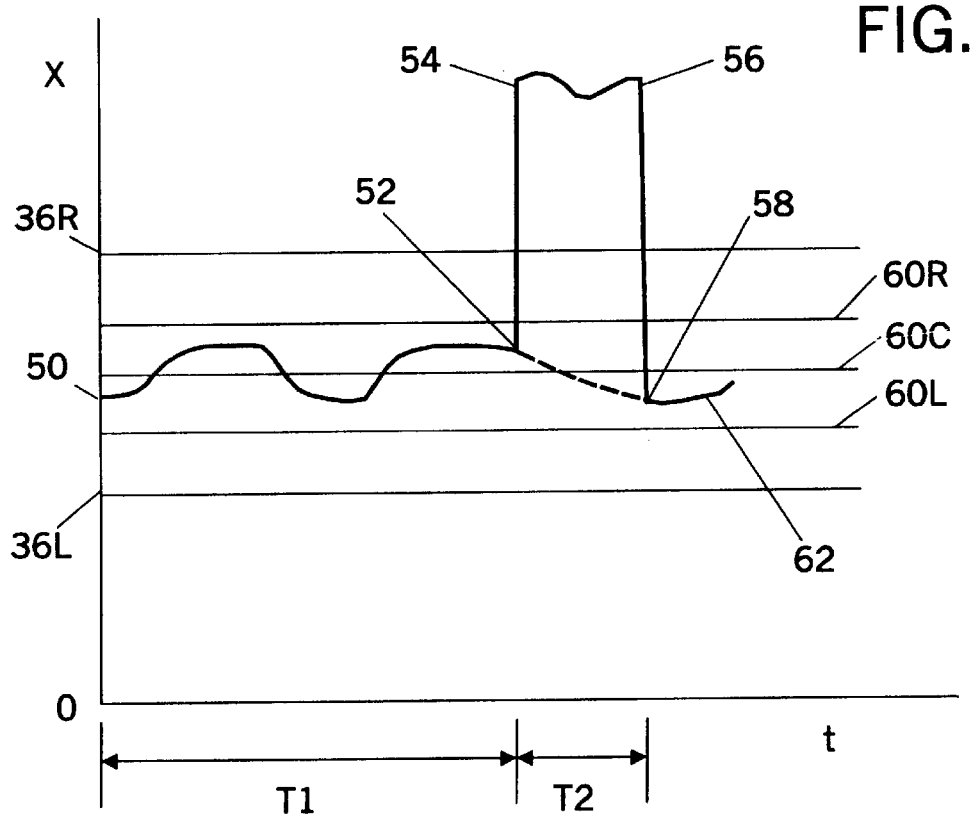
FIG. 2 is a graph of time versus position that illustrates the double touch input method of the present invention.

Referring to FIG. 2, at time t=0, position 50 represents the starting position wherein the finger first contacts the panel over the icon 36. The right boundary of the icon 36 is indicated in FIG. 2 by boundary line 36R, while the left boundary is indicated by line 36L. The coordinate data output of the touch panel 32 varies slightly as it tracks any minor changes in the point of contact between the finger and the panel, and just before time $T_1$ has elapsed, the point of contact has moved slightly to position 52. In the preferred embodiment, time $T_1$ is less than a predetermined period of time $T_{wait}$ (typically 0.5 seconds). Time $T_{wait}$ is determined in advance and preferably by the touch panel device driver, although other software or hardware could be used to establish the $T_{wait}$ period.

At the end of time period $T_1$, a second finger, preferably the middle finger 40, momentarily touches or "taps" the panel for a time period of $T_2$. In the preferred embodiment, $T_2$ is less than a predetermined period of time $T_{tap}$ (e.g., 0.2 seconds). Time period $T_{tap}$ is also determined in advance and preferably by the touch panel device driver, although other software or hardware could be used to establish the $T_{tap}$ period. The coordinate data output during time period $T_2$ also tracks any minor changes in finger contact position. Thus, at the beginning of period $T_2$, the indicated contact point is located at position 54, while it moves to position 56 at the end of this period. However, the indicated contact positions during time $T_2$ are approximately midway between the contact point of the first finger 34, and the contact point of the second finger 40.

If position 54 is greater than position 52 by a predetermined amount, the coordinate data for position 52 is temporarily stored. After time period $T_2$ has elapsed and the middle finger no longer contacts the touch panel, the coordinate output data indicates contact at position 58. If the difference between position 58 and position 56 is greater than a predetermined amount, then position 58 is temporarily stored. Next, if position 58 is within a predetermined range of position 52, then a double touch entry is assumed and the system is so notified. The right-hand limit of this predetermined range is illustrated in FIG. 2 as line 60R, while the lefthand limit is illustrated as line 60L. Thereafter, the index finger 34 is released from the touch panel 32 at an end position 62 and the output from the touch panel 32 is 0.

According to this embodiment, while the touch panel located on a display is pressed at a desired position by the index finger, which is a first pressing means, a position that is different from the desired position is tapped by the middle finger, which is a second pressing means. Coordinate data that is different by a predetermined amount from the coordinate data for the desired position is output by the touch panel. And coordinate data, which is output by the touch panel and which is obtained before and after tapping is performed, is employed to determine whether or not to acknowledge that double touching has been performed at the desired position.

As is described above, while the touch panel located on a display is pressed at a desired position by the index finger, which is a first pressing means, a position that is different from the desired position is tapped by the middle finger, which is a second pressing means, so that the double-touching on the touch panel can be precisely acknowledged, even with a high resolution display.

Figure 3:
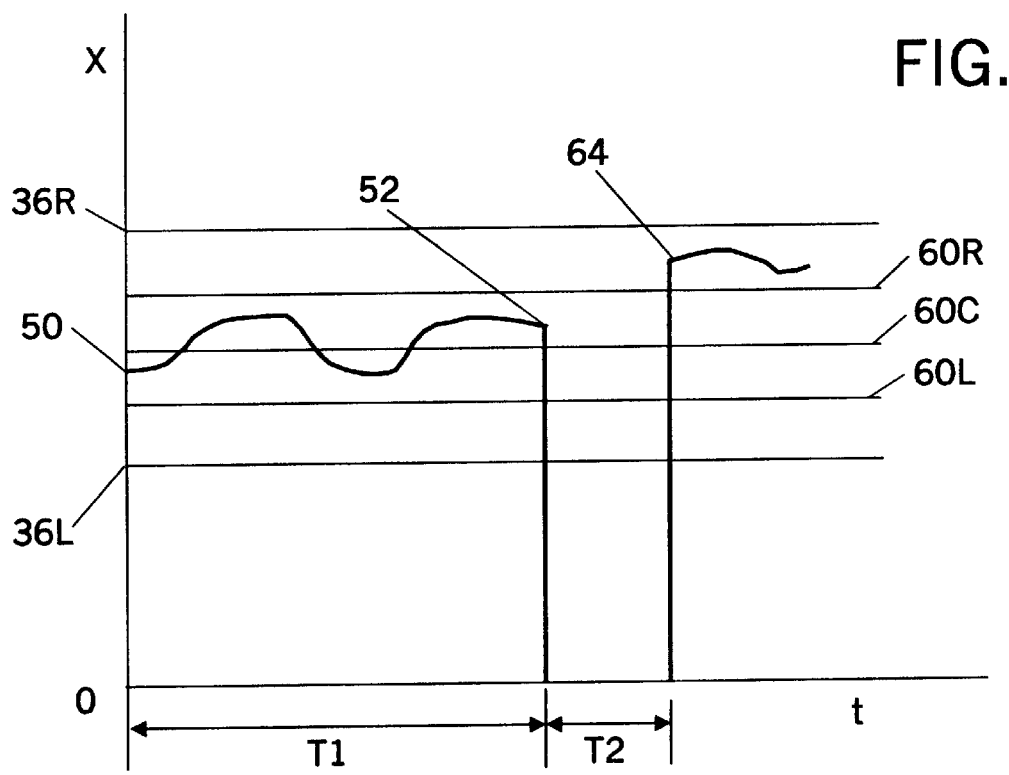
FIG. 3 is a graph of time versus position that illustrates the conventional double tap input method.

As a comparison example, a conventional double-tapping method will now be explained with reference to FIG. 3, which shows the transient positional changes for a finger in the X direction. In conventional double-tapping, continuity in time for maintaining a position within a desired permissible range is cut off between the first tap and the second tap that is performed by a single finger. Thus, even when the positional locus up to the position 52, which is obtained by the first tap, is the same as is shown in FIG. 2, probably, the distance difference between the position 52 and the position 64, which is obtained by the second tap, will be great.

According to the method of the present invention for acknowledging double-touching, since the touch panel 32 can be continuously pressed by the index finger, the difference between the first and the second tapping positions, which is acquired within a brief time by the tapping with the middle finger, can fall within the permissible range.

The apparatus for detecting the double-touch input method described above is preferably implemented as a device driver, although other hardware and software implementations are also possible and within the scope of the invention. Accordingly, a flowchart for a device driver will now be described; however, those of ordinary skill in the art will understand how to implement the invention illustrated in the device driver flowchart of FIG. 4 in other hardware or software.

Figure 4:
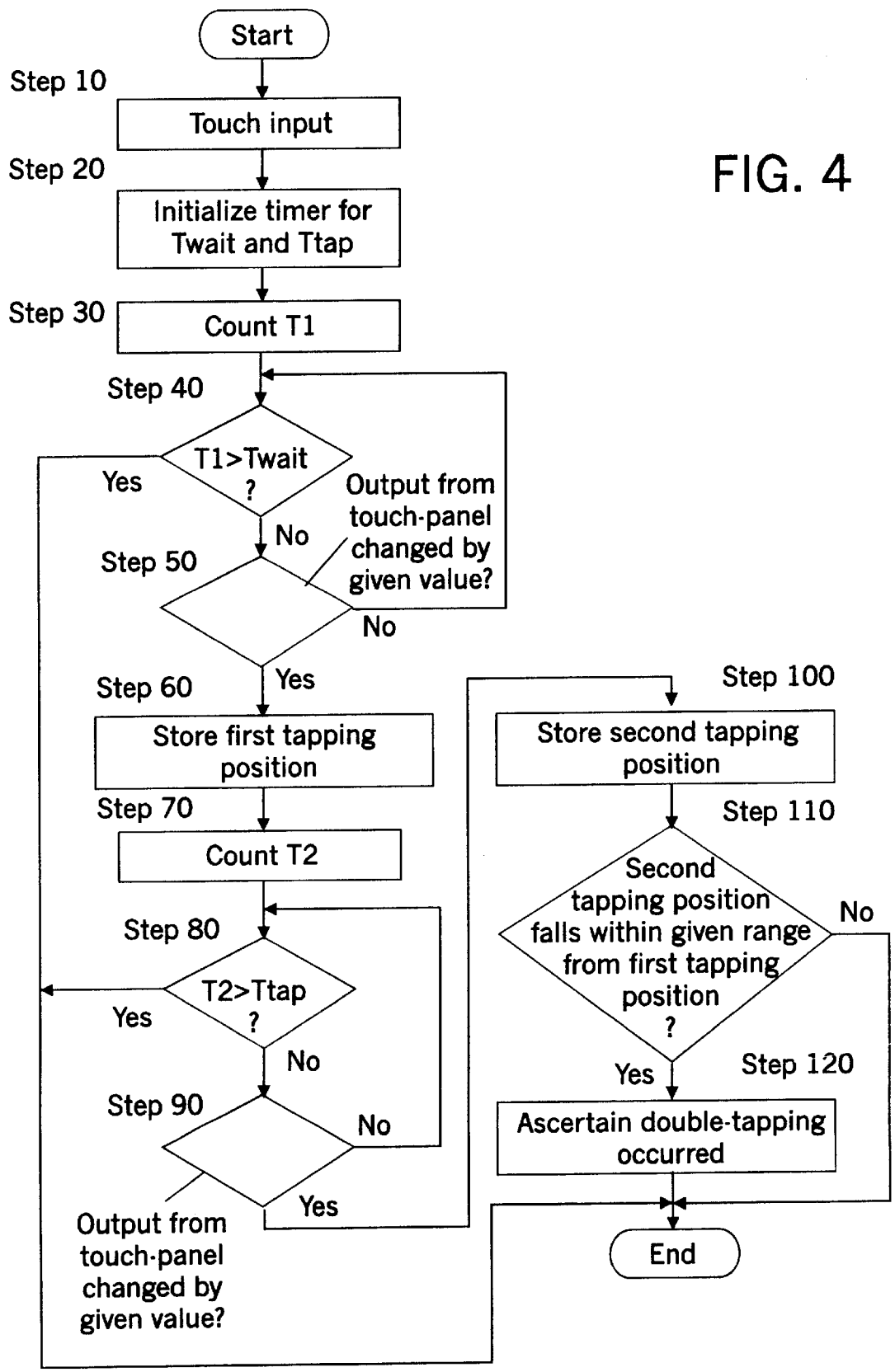
FIG. 4 is a flowchart of a driver for detecting the double touch input method of the present invention.
Figure 5:
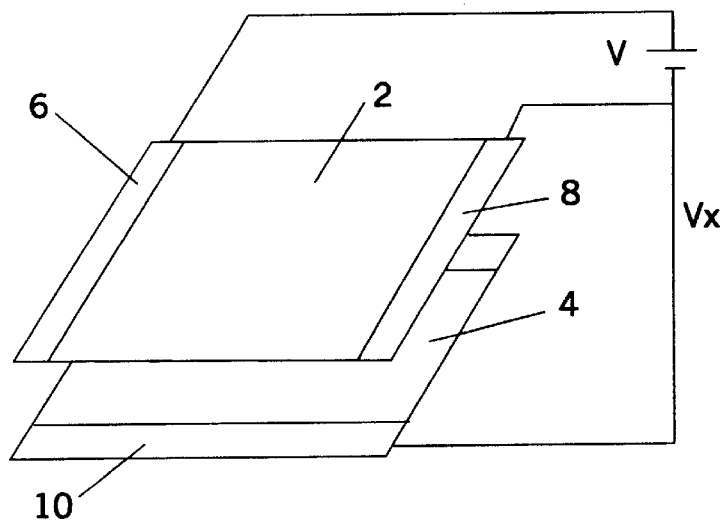
FIG. 5 illustrates the internal construction of a resistance type touch panel.
Figure 6:
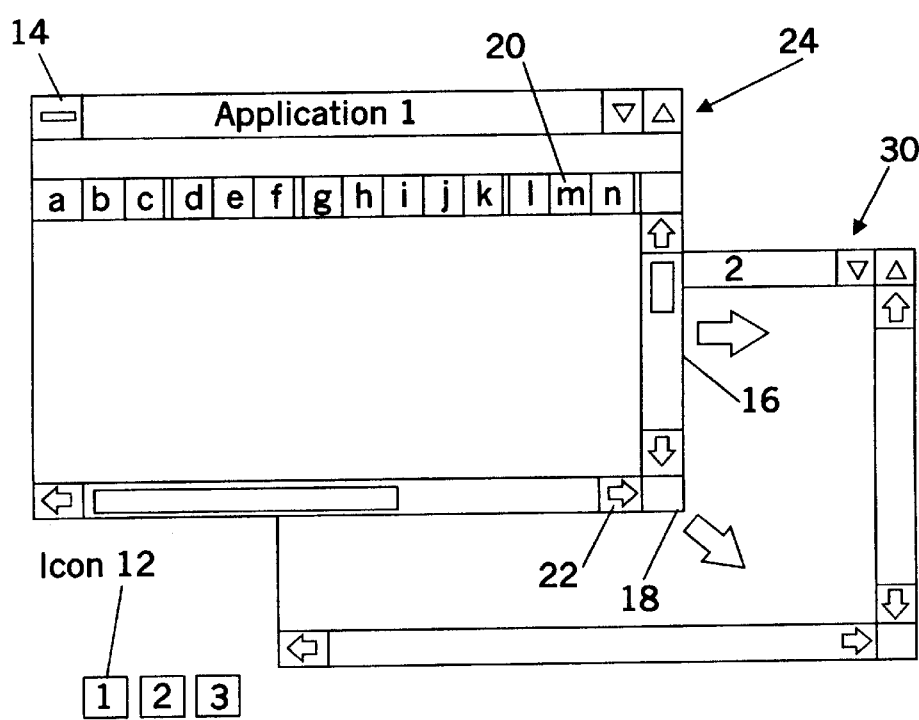
FIG. 6 illustrates several applications for various touch input methods.

Referring to FIG. 4, a check is first performed at step 10 to determine whether or not a touch input has occurred. If a touch input is confirmed, a timer is initialized at step 20, which begins to count the time period T1 as indicated in step 30. This timer is used as one of the checks in the determination of whether or not a double-touch input has occurred.

At step 40, time $T_1$ is compared with a predetermined time limit $T_{wait}$ to determine whether or not the input (e.g., finger contact) which began at step 10 has continued for this predetermined time. If $T_1 > T_{wait}$, the driver concludes that double-touching has not occurred and the processing is thereafter terminated. If $T_1 \leq T_{wait}$, a check is performed at step 50 to determine whether the coordinate data output from the touch panel 32 has changed by a predetermined value or more and, if such a positional change has occurred, the position of the touch immediately prior to the change (position 52) is temporarily stored at step 60.

At step 70 the timer begins to count time period T2. At step 80, time T2 is compared with a predetermined time limit $T_{tap}$ to determine whether or not the input (which was caused in part by the contact of the second finger) has continued for this predetermined time. If $T_1 > T_{tap}$, the driver concludes that double-touching has not occurred and the processing is thereafter terminated. If $T_1 \leq T_{tap}$, a check is performed at step 90 to determine whether the coordinate data output from the touch panel 32 has changed by another predetermined value or more and, if such a positional change has occurred, the position of the touch immediately after the change (position 58) is temporarily stored at step 100.

At step 110, position 58 is compared with position 52 and if it is within a predetermined range of position 52, then the driver concludes that double-touching has occurred. If the difference in position falls outside the predetermined range, it is assumed that double-touching has not occurred, and the processing is thereafter terminated.

The length of predetermined time periods $T_{wait}$ and $T_{tap}$ may be properly determined in consonance with the speed at which operator's fingers are moved. Or, while taking the speed of movement into consideration, the time length may be arbitrarily changed within a predetermined range. Further, a predetermined range for a change in the output by a touch panel may be properly altered in consonance with a display resolution, a resolution of the output of a touch panel, and a display dimension.

In this manner, a special hardware device is not required and only a simple alteration of a device driver ensures an accurate double-touch detection function. Further, according to the present invention, there is no need to rewrite the operating system and application programs.

Besides the above embodiment, various other modifications are available for the present invention. Although a sheet resistance touch panel is employed for this embodiment of the present invention, the present invention is not limited to this, and can be applied in the same manner for an optical touch panel.

In addition, although the index finger and the middle finger are employed as preferred touch input means for this embodiment, any two fingers may be employed and the two fingers do not necessarily have to be on the same hand. For example, while the icon 36 is pressed by the index finger of one hand, the index finger on the other hand may be used for tapping. Further, the touch input means is not limited to fingers, and a pen or another similar rod-shaped article can be used.

Although the positions 52 and 58 serve as double-touching positions in this embodiment, a device driver can be differently programmed, and sampling can be performed for data for the position 52 obtained a predetermined time before, and data for the position 58 obtained a predetermined time after, so that these positions are regarded as positions for acknowledging double-touching.

We claim as our invention:

1. An input detection apparatus for use with a touch panel that outputs coordinate data indicative of the location on the panel touched by an object; and for use with a double touch input method wherein a first finger contacts the touch panel at a first location, and remains in contact with the touch panel while a second finger momentarily contacts the touch panel at a second location; said input detection apparatus comprising:

means for determining a first elapsed time between the beginning of the contact by the first finger and the beginning of the contact by the second finger, and for determining if said first elapsed time is less than a first predetermined period of time;

means for determining a first distance between the point of contact by the first finger at a time prior to contact by the second finger, and the point of contact by the second finger, and for determining if said first distance is greater than a first predetermined distance; and means for determining a second elapsed time between the beginning of contact by the second finger and the disengagement of contact by the second finger, and for determining if said second elapsed time is less than a second predetermined period of time.

2. The input detection apparatus of claim 1, further comprising means for determining a second distance between the point of contact by the first finger at a time prior to contact by the second finger, and the point of contact by the first finger at a time subsequent to disengagement of the second finger, and for determining if said second distance is less than a second predetermined distance.

3. A computer system for use with a double touch input method wherein a first finger contacts the touch panel at a first location, and remains in contact with the touch panel while a second finger momentarily contacts the touch panel at a second location, said computer system comprising:

a display having a touch panel, said touch panel providing coordinate data indicative of the location on the panel touched by an object; and input detection apparatus comprising: a) means for determining a first elapsed time between the beginning of the contact by the first finger and the beginning of the contact by the second finger, and for determining if said first elapsed time is less than a first predetermined period of time; b) means for determining a first distance between the point of contact by the first finger at a time prior to contact by the second finger, and the point of contact by the second finger, and for determining if said first distance is greater than a first predetermined distance; and c) means for determining a second elapsed time between the beginning of contact by the second finger and the disengagement of contact by the second finger, and for determining if said second elapsed time is less than a second predetermined period of time.

4. The computer system of claim 3, wherein said input detection apparatus further comprises means for determining a second distance between the point of contact by the first finger at a time prior to contact by the second finger, and the point of contact by the first finger at a time subsequent to disengagement of the second finger, and for determining if said second distance is less than a second predetermined distance.

* * * * *